(12) United States Patent
Neumann et al.

(10) Patent No.: US 8,149,578 B2
(45) Date of Patent: Apr. 3, 2012

(54) AIRFLOW RESTRICTOR DOOR

(75) Inventors: Matthew Daniel Neumann, Roseville, CA (US); Sean Anthony Cerniglia, Cool, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 235 days.

(21) Appl. No.: 12/610,314

(22) Filed: Oct. 31, 2009

(65) Prior Publication Data

US 2011/0103005 A1 May 5, 2011

(51) Int. Cl.
*H05K 7/20* (2006.01)

(52) U.S. Cl. .......................... 361/690; 361/694; 361/695

(58) Field of Classification Search .................. None
See application file for complete search history.

(56) References Cited

U.S. PATENT DOCUMENTS

| | | | | |
|---|---|---|---|---|
| 5,734,551 A * | 3/1998 | Hileman et al. | ............... | 361/695 |
| 7,542,289 B2 * | 6/2009 | Tsai et al. | ..................... | 361/695 |
| 7,646,601 B2 * | 1/2010 | Zhang et al. | .................. | 361/695 |
| 7,830,659 B2 * | 11/2010 | Liu et al. | ....................... | 361/690 |
| 2008/0117589 A1 * | 5/2008 | Carrera et al. | ................ | 361/687 |
| 2009/0027852 A1 * | 1/2009 | Roesner et al. | ............... | 361/690 |
| 2009/0233537 A1 * | 9/2009 | Kao et al. | ....................... | 454/184 |
| 2010/0105313 A1 * | 4/2010 | Tsai et al. | ...................... | 454/284 |
| 2010/0165568 A1 * | 7/2010 | Tsai et al. | ................. | 361/679.49 |

* cited by examiner

*Primary Examiner* — Gregory Thompson

(57) ABSTRACT

An airflow restrictor door is pivotably supported by and extends from a support towards a card receiving bay.

26 Claims, 8 Drawing Sheets

AIRFLOW RESTRICTOR DOOR

BACKGROUND

Airflow is sometimes used to cool electronic devices. Existing structures used to direct the airflow are often difficult to install and difficult to use.

DETAILED DESCRIPTION OF THE EXAMPLE EMBODIMENTS

Figure 1:
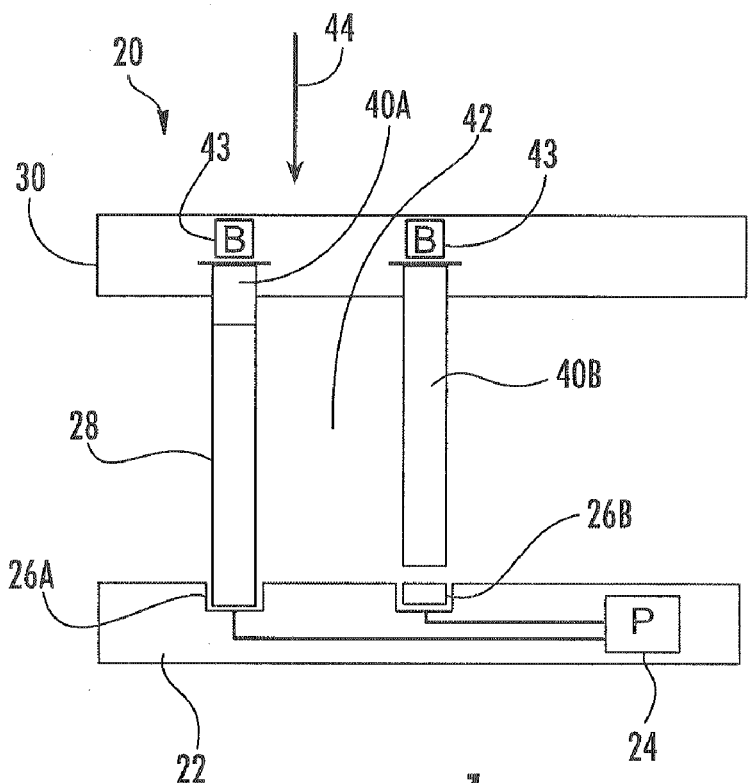
FIG. 1 is a sectional view schematically illustrating a computing device having airflow restrictor doors according to an example embodiment.
Figure 2:
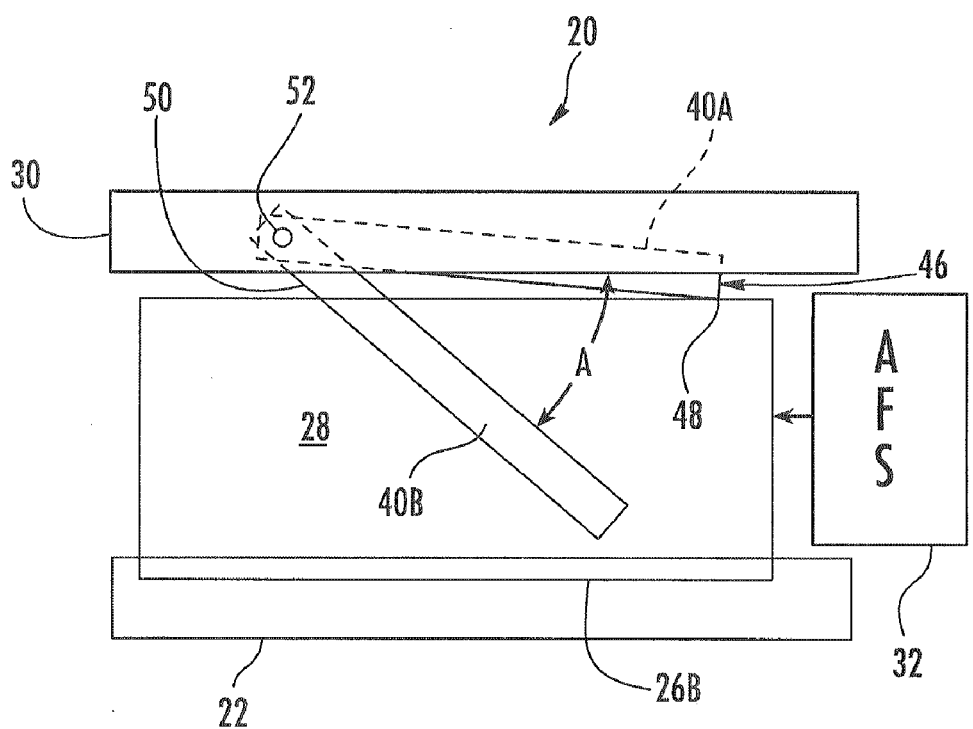
FIG. 2 is another sectional view schematically illustrating the computing device of FIG. 1 according to an example embodiment.

FIGS. 1 and 2 schematically illustrate a computing device 20 according to an example embodiment. Computing device 20 includes one or more heat generating components that are cooled. As will be described hereafter, computing device 20 includes structures that direct airflow to cool the one of more heat generating components and that may be installed and used with greater ease.

Computing device 20 comprises base 22, one or more processing units 24 (shown in FIG. 1), card receiving bays 26A, 26B (collectively referred to as card receiving bays 26), card 28, support 30, airflow source 32 (shown in FIG. 2) and airflow restrictor doors 40A, 40B (collectively referred to as airflow restrictor doors 40). Base 22 comprises one or more structures enclosing, providing or supporting at least processing units 24 and card receiving bays 26. In one embodiment, base 22 may comprise a printed circuit board, such as a motherboard, to which one or more processing units 24 are connected. The circuit board or motherboard may additionally include card receiving bays 26 as well as other electronic or computing components. In still other embodiments, base 22 may comprise one or more structures serving as a housing or foundation for a separate motherboard or a separate circuit board as well as one or processing units and card receiving bays 26.

The one of more processing units 24 comprise processors electrically connected to card receiving bays 26. Processing units 24 may utilize the additional memory or other capabilities provided by cards 28 when cards 28 are connected to base 22 by card receiving bays 26. In one embodiment, the one more processing units 24 generate heat during their operation that is dissipated by airflow across such processors 24.

Card receiving bays 26 comprise structures configured to facilitate connection of cards 28 to base 22 and to the one or more processing units 24. According to one embodiment, card receiving bays 26 comprise sockets having either pins or electrically conductive pads for facilitating connection of the one or processing units 24 to the one or more cards 28 such that electrical signals may be transmitted therebetween. In other embodiments, in lieu of comprising female sockets, card receiving bays 26 may include male projections that interact with cards 28 to support cards 28 and to facilitate the transmission of signals between card 28 and the one or more processing units 24.

Card 28 comprises a removable and insertable card or module providing additional functionality or capabilities for computing device 20. Part 28 is configured to be removably connected to base 22 by a corresponding card receiving bay 26. In the example illustrated, card 28 is illustrated as being connected to the one or more processing units 24 by card receiving bay 26A. In one embodiment, card 28 comprises a memory card or memory module having contact pins or contact pads which make electrical connection in bay 26A to facilitate the transmission of signals therebetween. According to one embodiment, card 28 comprises a dual in-line memory module (DIMM) having a printed circuit board, one or more dual random access memory (DRAM) units and one or more associated heat sinks. In other embodiments, card 28 may comprise other printed circuit boards supporting other memory components or other computing or electrical componentry.

Support 30 comprises one or more structures supported opposite to base 22 so as to form an interior 42 there between. Interior 42 comprises a space in which cards 28 and other computing components are contained. Interior 42 further provides passages or volumes through which airflow from airflow source 32 may flow to dissipate heat from the heat generating components of computing device 20, such as the one or more processors 24. In one embodiment, support 30 comprises a cover, top, baffle, shell or other structure that is lowered or otherwise disposed over and onto base 22 and any cards 28 supported by base 22 in the general direction indicated by arrow 44. In other embodiments, support 30 may be connected to base 22 in other fashions.

Airflow source 32, schematically shown, comprises one or mechanisms configured to create air or other fluid flow through interior 42 so as to dissipate heat generated by the one of more heat generating components of computing device 20, such as the one or more processing units 24. In one embodiment, airflow source 32 comprises one or more blowers or fans. In other embodiments, other devices may use to create such airflow.

Airflow restrictor doors 40 comprise panels, fingers, or other structures pivotably coupled to and supported by support 30. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members. The term "fluidly coupled" shall mean that two are more fluid transmitting volumes are connected directly to one another or are connected to one another by intermediate volumes or spaces such that fluid may flow from one volume into the other volume.

Airflow restrictor doors 40 hang from support 30 and extend towards a directly opposite card receiving bay 26. Each of doors 40 is pivotable between an extended position across a corresponding bay 26 and a retracted position withdrawn from the corresponding opposite bay 26. According to one embodiment, each of doors 40 is resiliently biased towards the extended position by a bias 43 (schematically shown), such as a spring. In other embodiments, bias 43 may be omitted.

In the example illustrated in FIGS. 1 and 2, card receiving bay 26A is occupied or connected to card 28 while card receiving bay 26B is empty or is not connected to any card 28. Airflow restrictor door 40A is retained in a retracted position, against bias 43, above card 28. Bias 43 resiliently urges the end 46 of door 40A against a top edge 48 of card 28. In the example illustrated, a portion of door 40A is received within a recess or pocket of support 30. During disposition of support 30 and doors 40 opposite to base 22 and card 28, door 40A contacts edge 48 of card 28 and is moved against the bias 43 to the retracted position.

Because card receiving bay 26B is unoccupied, the bias associated with door 40B urges door 40B to the extended position. In the extended position, door 40B restricts airflow through interior 42 on a side of card 28. As a result, a greater volume of air flows has a greater velocity across the heat generating components of computing device 20 to dissipate heat. Because doors 40 automatically move between the extended position and the retracted position in response to the presence or absence of a card in the corresponding opposite card receiving bay 26, installation or assembly of computing device 20 is facilitated.

As shown by FIG. 2, in the example illustrated, when fully extended, door 40B extends oblique to both base 22 and support 30. Door 40B has an end portion 50 while support 30 has a supporting portion 52 which cooperates with end portion 50 to limit rotation or pivoting of door 40B, under the influence of bias 43 (shown in FIG. 1), in a clockwise direction as seen in FIG. 2, towards base 22. Because door 40B is oblique with respect to base 22 as well as oblique to edge 48 of card 28 (when card 28 is present in the opposite card receiving bay 26), door 40B may be pivoted against bias 43 towards the retracted position upon contacting edge 48 with less force while support 30 is parallel to base 22. As a result, actuation of those doors 40 to the retracted position in the presence of opposite cards 28 is facilitated. In other embodiments, doors 40 may be perpendicular to support 30 when fully extended, wherein retraction of doors 40 is facilitated by orienting support 30 and base 22 oblique to one another as support 30 is moved towards base 22 during assembly.

According to one embodiment, doors 40 are supported and retained at an angle A of less than or equal to 60 degrees. In another embodiment, doors 140 are supported and retained at an angle of less than or equal to about 45 degrees to maximize a lever arm for moving doors 40. In the example illustrated, doors 40 are supported and retained at an angle of about 53 degrees with respect to the general plane along which support 130 extends. In other embodiments, doors 40 may be supported and retained at other angles when in the extended position. In one embodiment, end portions 50 and supporting portions 52 comprise stop surfaces. In other embodiments, the limiting of the pivoting of doors 40 may be attained in other manners.

Figure 3:
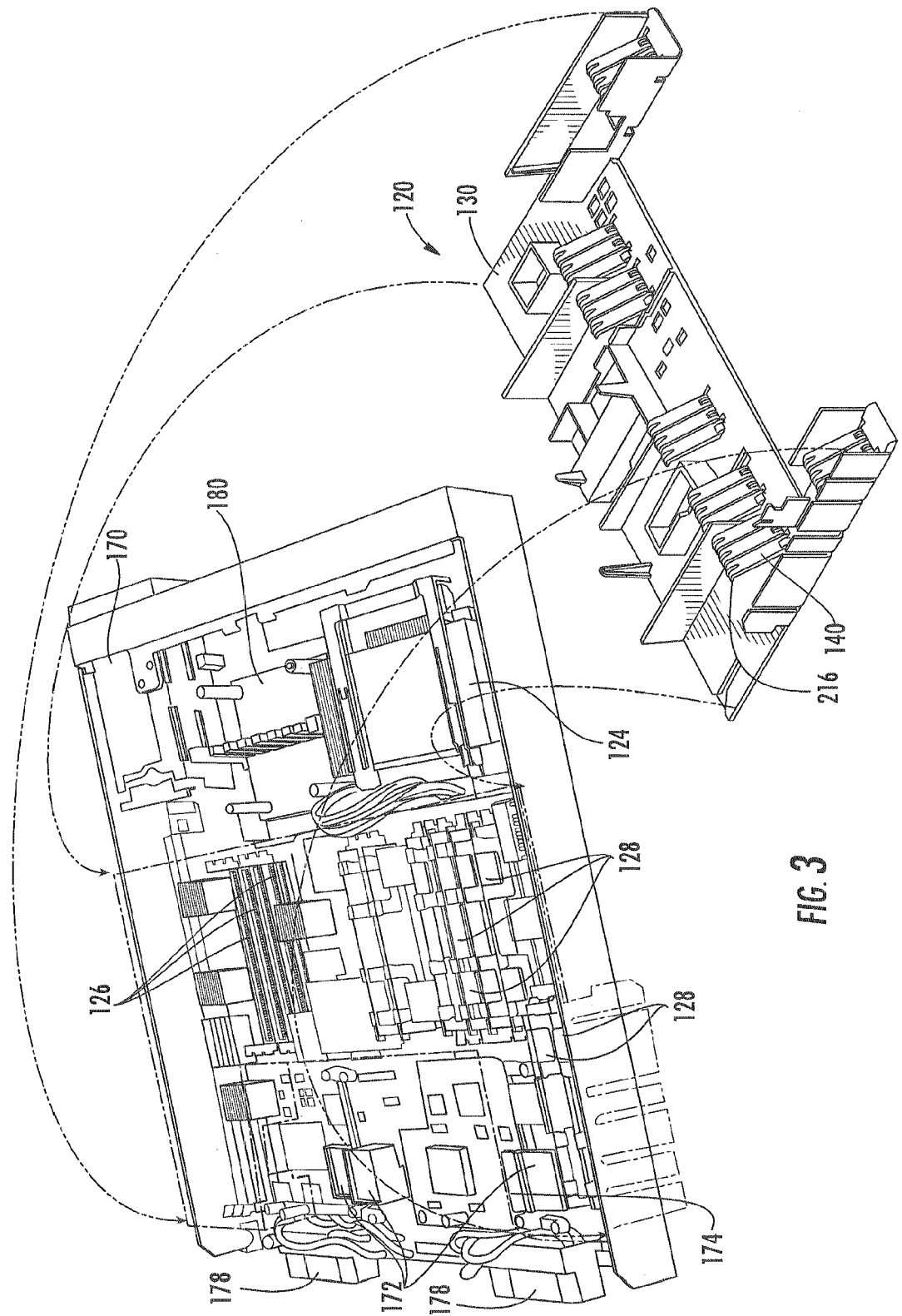
FIG. 3 is an exploded top perspective view of another embodiment of the computing device of FIG. 1 according to an example embodiment.

FIGS. 3-8 illustrate computing device 120 (shown as a server blade), another embodiment of computing device 20. As shown by FIG. 3, computing device 120 comprises base 122, one or more processing units 124, card receiving bays 126A, 126B (collectively referred to as card receiving bays 126), cards 128A, 128B (collectively referred to as cards 128), support 130, airflow source 32 (shown in FIG. 2) and airflow restrictor doors 140A, 140B (collectively referred to as airflow restrictor doors 140). Base 122 comprises one or more structures enclosing, providing or supporting at least one processing unit 24 and card receiving bays 126. In the embodiment illustrated, base 122 comprises a printed circuit board, such as a motherboard, to which one or more processing units 124 are connected. The circuit board or motherboard additionally includes card receiving bays 126 as well as other electronic or computing components. In the example illustrated, the motherboard of base 122 additionally supports or is connected to hard disk drives 170 and connectors 172 for connection to input/output cards 174.

The motherboard of base 122 is further connected to blade connectors 178. Blade connectors 178 electrically connect the individual blade shown to another printed circuit board or backplane circuit board which is part of a larger computing device. The larger computing device may include additional blades (similar to the blade shown) attached to the same backplane circuit board. The larger computing device further includes one or more power supplies and one or more fans that serve as an airflow source 32. In other embodiments, base 122 may comprise one or more structures serving as a housing or foundation for a separate motherboard or a separate circuit board as well as one or processing units and card receiving bays 126.

The one of more processing units 124 are mounted to the motherboard of base 122. Although computing device 120 is also it has including a single processing unit 124, and other embodiments, and additional processing unit may also be mounted to base 122 in the socket location 180 (lying beneath a protective cover in the illustration). Processing units 124 may utilize the additional memory or other capabilities provided by cards 128 when cards 128 are connected to base 122 by card receiving bays 126. In one embodiment, the one more processing units 124 generate heat during their operation that is dissipated by airflow across such processors 124.

Card receiving bays 126 comprise structures configured to facilitate connection of cards 128 to base 122 and to the one or more processing units 124. According to one embodiment, card receiving bays 126 comprise sockets having either pins or electrically conductive pads for facilitating connection of the one or processing units 124 to the one or more cards 128 such that electrical signals may be transmitted therebetween. In other embodiments, in lieu of comprising female sockets, card receiving bays 126 may include male projections that interact with cards 128 to support cards 128 and to facilitate the transmission of signals between card 128 and the one or more processing units 24.

Figure 8:
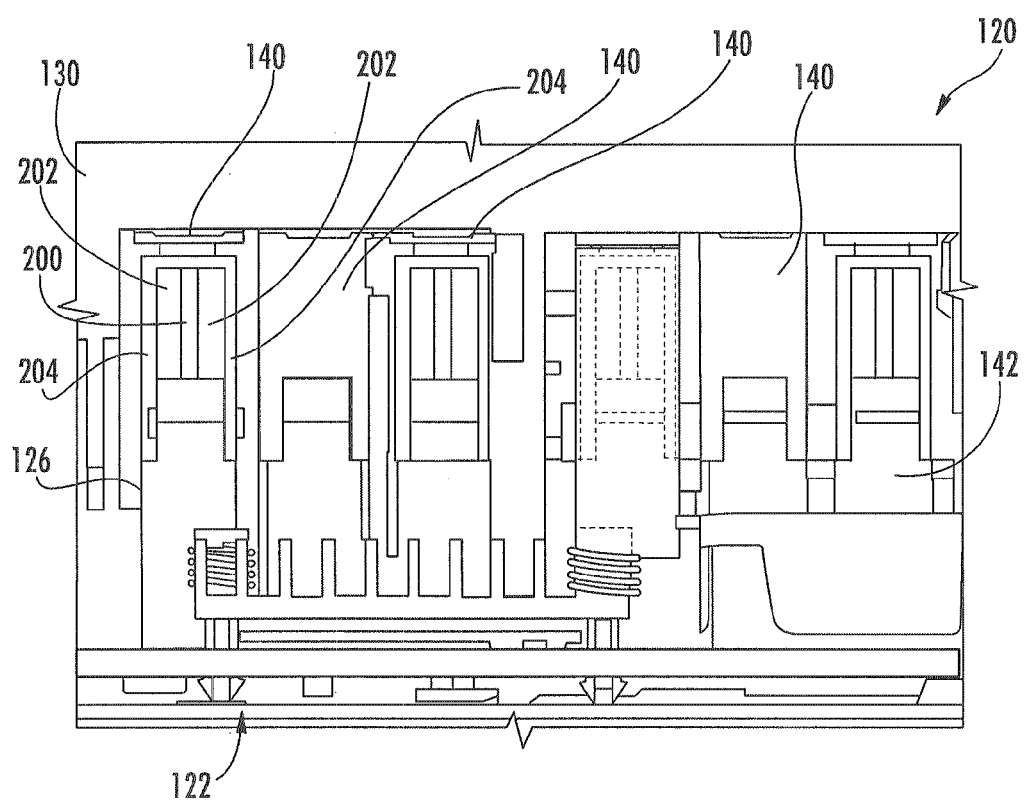
FIG. 8 is a sectional view of the computing device of FIG. 3 according to an example embodiment.

Cards 128 comprise removable and insertable cards or modules providing additional functionality or capabilities for computing device 120. Cards 128 are configured to be removably connected to base 122 by a corresponding card receiving bay 126. In the example illustrated, cards 128 are illustrated as being connected to the one or more processing units 24 by card receiving bays 126. In the example illustrated, cards 128 comprise memory cards or memory modules having contact pins or contact pads which make electrical connection in bays 126 to facilitate the transmission of signals there between. According to one embodiment, as shown by FIG. 8, cards 128 each comprise a dual in-line memory module (DIMM) having a printed circuit board 200, one or more dual random access memory (DRAM) units 202 and one or more associated heat sinks 204. In other embodiments, cards 128 may comprise other printed circuit boards supporting other memory components or other computing or electrical componentry.

Figure 9:
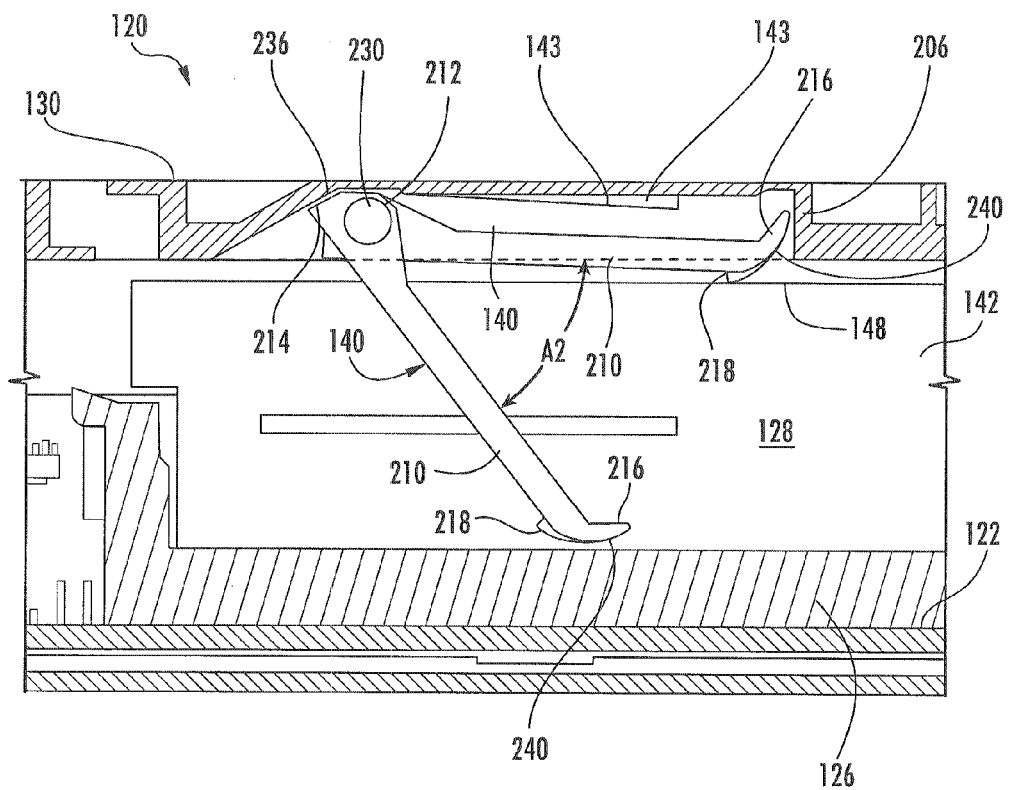
FIG. 9 is another sectional view of the computing device of FIG. 3 according to an example embodiment.

As shown by FIGS. 8 and 9, support 130 comprises one or more structures supported opposite to base 122 so as to form an interior 142 there between. Interior 142 comprises a space in which cards 128 and other computing components are contained. Interior 142 further provides passages or volumes through which airflow from airflow source 32 (shown in described with respect to FIG. 2) may flow to dissipate heat from the heat generating components of computing device 120, such as the one or more processors 24. In one embodiment, support 130 comprises a cover, top, baffle, shell or other structure that is lowered over and onto base 122 and any cards 128 supported by base 122. In other embodiments, support 130 may be connected to base 122 in other fashions.

As further shown by FIG. 3 and FIG. 9, support 130 includes recesses, depressions, cavities or pockets 206. Pockets 206 are sized and located so as to at least partially receive doors 140 when doors 140 are retracted and are in contact with edge 148 of the opposite corresponding card 128. As shown by FIG. 8, in one embodiment, pockets 206 receive a majority of the corresponding door 140 when the door is retracted. In other embodiments, pockets 206 may have other dimensions or may be omitted.

Airflow source 32 is shown and described above with respect to FIG. 2. As noted above, airflow source 32 comprises one or mechanisms configured to create a air or other fluid flow through interior 142 so as to dissipate heat generated by the one of more heat generating components of computing device 120, such as the one or more processing units 24. In one embodiment, airflow source 132 comprises one or more blowers or fans. In other embodiments, back in her other devices may use to create such airflow.

Figure 4:
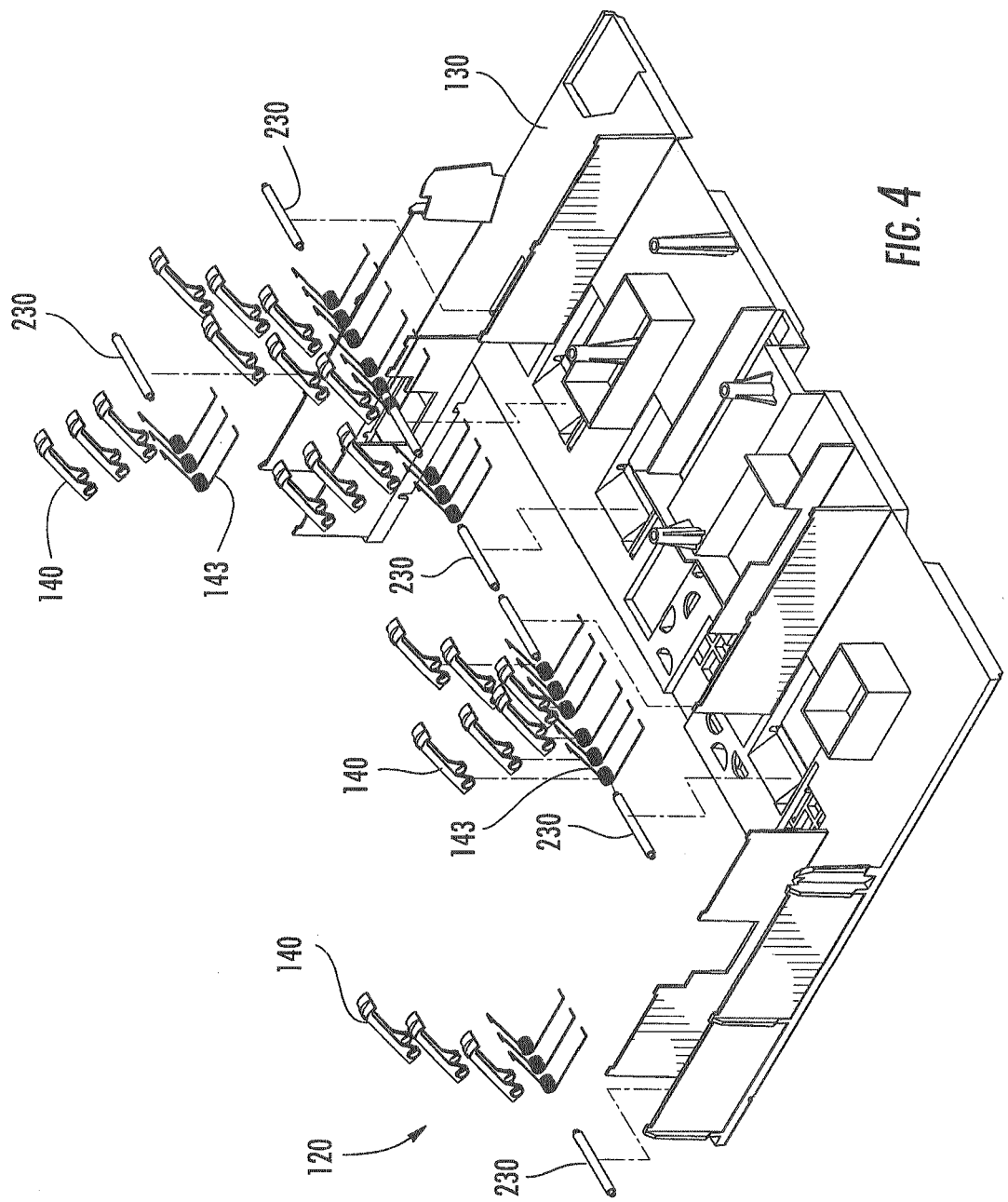
FIG. 4 is a bottom exploded perspective view of a support and airflow restrictor doors of the computing device of FIG. 3 according to an example embodiment.

As shown by FIGS. 3 and 4, airflow restrictor doors 140 comprise panels, fingers, or other structures pivotably coupled to and supported by support 130. Airflow restrictor doors 140 hang from support 130 and extend towards a directly opposite card receiving bay 126. Each of doors 140 is pivotable between an extended position across a corresponding bay 126 (shown in FIG. 8) and a retracted position withdrawn from the corresponding opposite bay 26 (shown in FIG. 8). According to one embodiment, each of doors 140 is resiliently biased towards the extended position by a bias 143 such as a spring. In the example illustrate, bias 143 comprises a torsion spring having one end bearing against support 130 and an opposite end bearing against the particular door 140 being biased. In other embodiments, bias 43 may comprise other forms of springs, may be integrally formed as part of single unitary body with door 140 or may be omitted.

Figure 5:
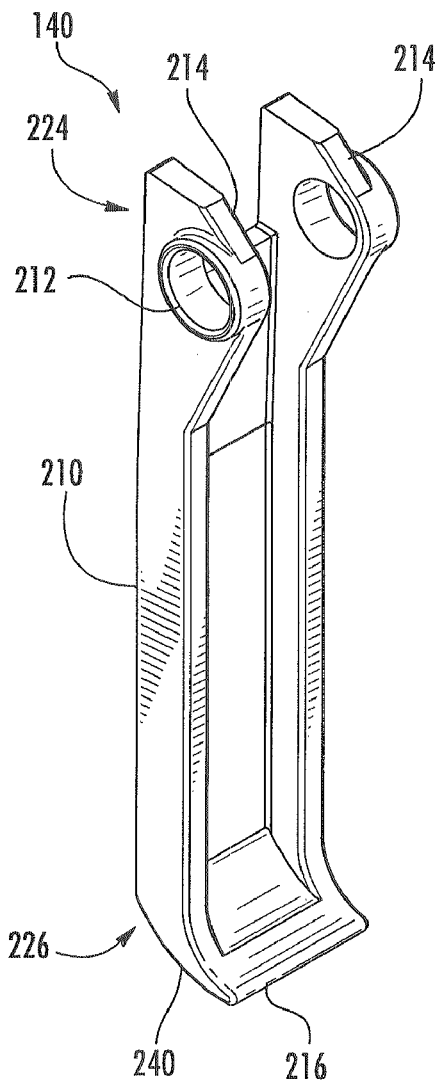
FIG. 5 is a rear top perspective view of an airflow restrictor door of the computing device of FIG. 3 according to an example embodiment.
Figure 6:
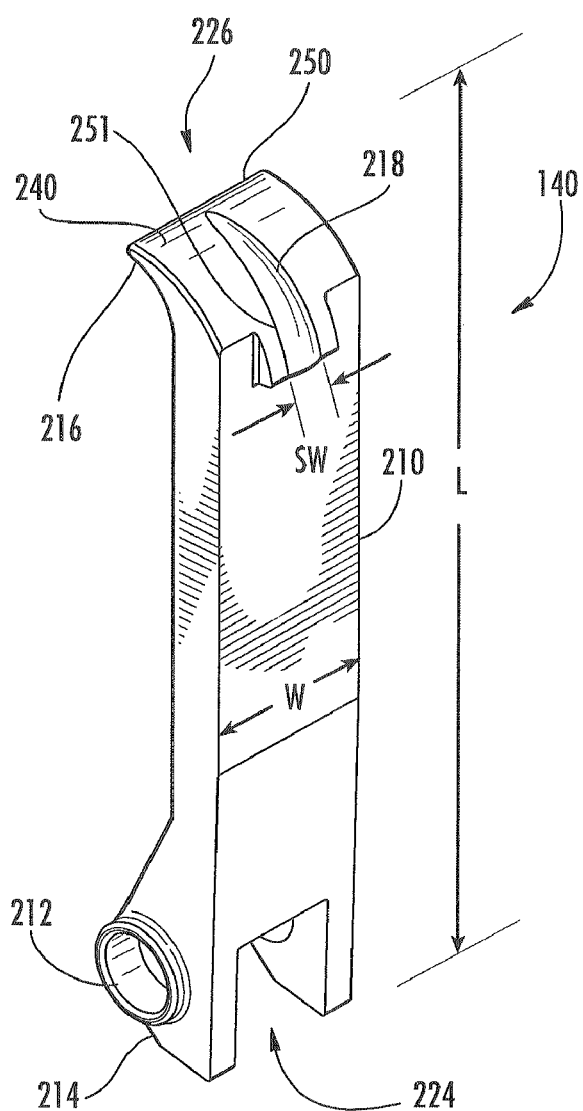
FIG. 6 is a front bottom perspective view of the airflow restrictor door of FIG. 4 according to an example embodiment.
Figure 7A:
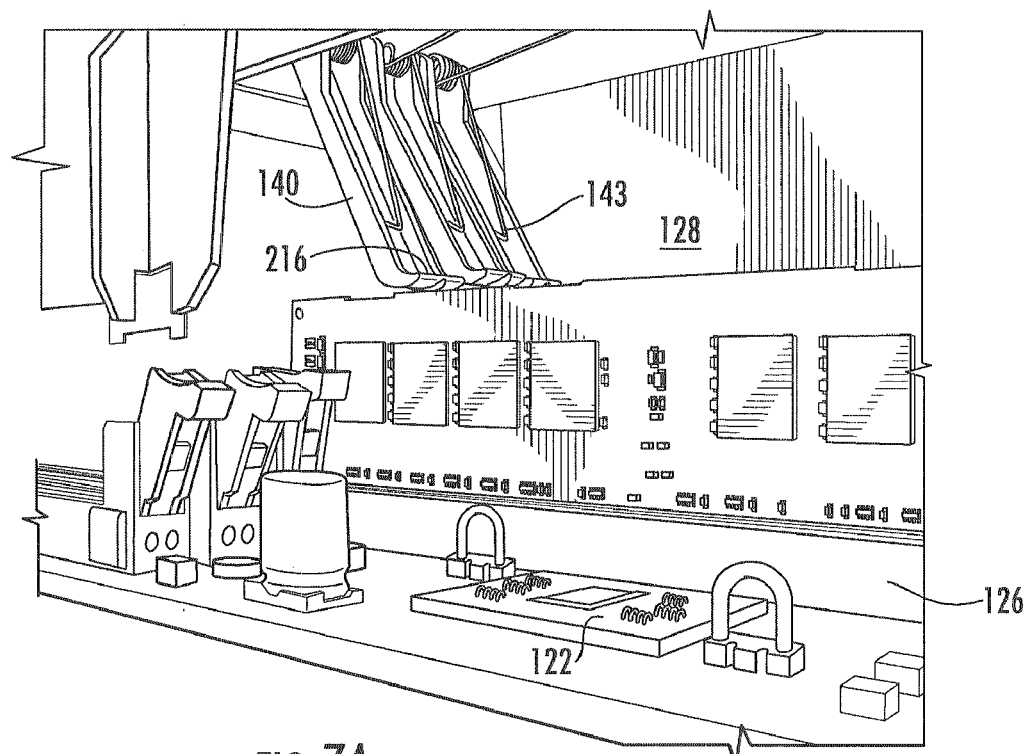
FIGS. 7A-7B are perspective views illustrating the disposition of airflow restrictor doors with respect to cards of the computing device of FIG. 3 according to an example embodiment.
Figure 7B:
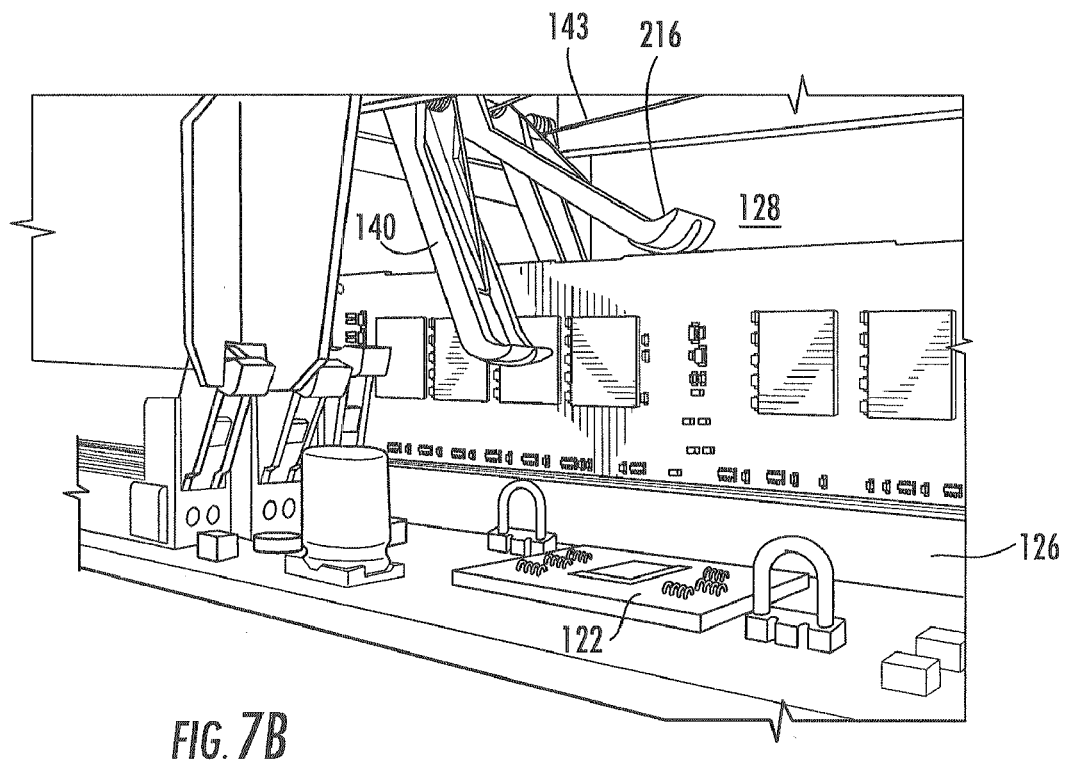
Figure 7C:
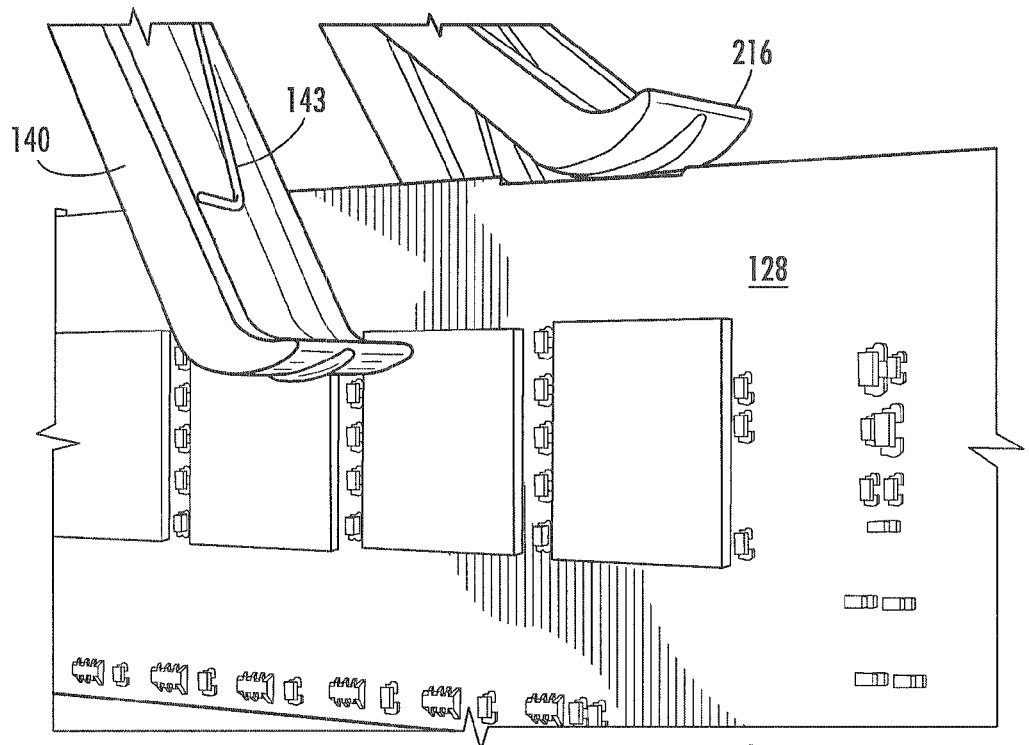
Figure 7D:
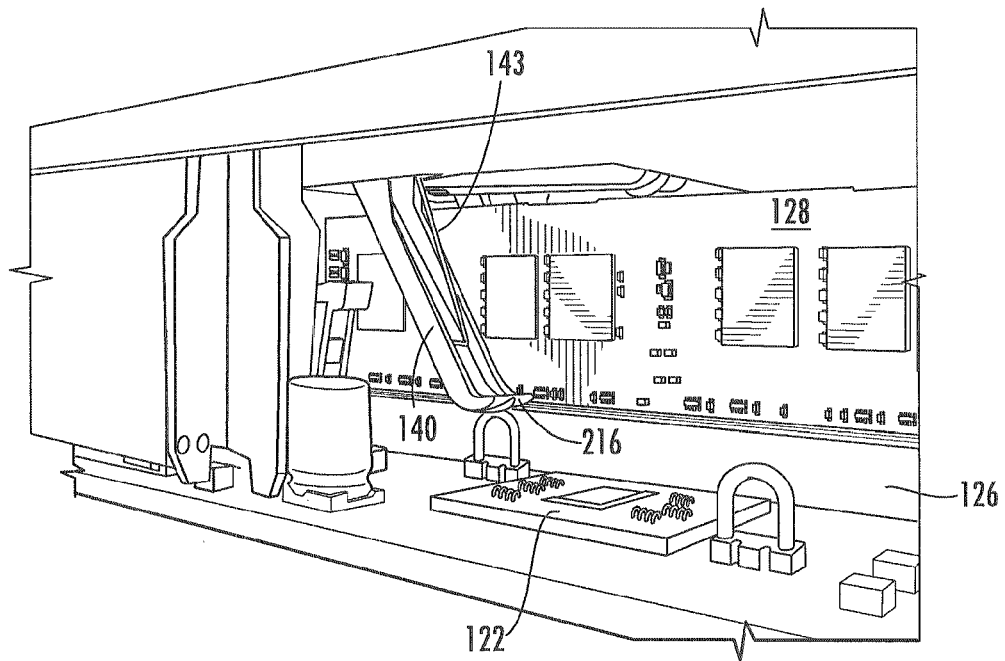

FIGS. 5 and 6 illustrate an individual door 140 in detail. As shown by FIGS. 5 and 6, each door 140 comprises an elongate leg portion 210, pivot bore 212, stop surfaces 214, foot 216 and spline 218. Leg portion 210 extends from a first end 224 to a second opposite end 226. Leg portion 210 is sufficiently imperforate so as to impede, block, attenuate or restrict fluid flow, such as airflow, across or through leg portion 210. Leg portion 210 is dimensioned so as a substantially occupy a void or space within interior 142 which would otherwise be occupied by a card 128 when present. In other words, leg portion 210 has a width at least equal to or larger than a width of an individual card 128. According to one embodiment, leg portion 210 has a width W (shown in FIG. 5) of at about 6 mm and nominally about 8 mm. According to one embodiment, leg portion 210 has a length L of at least about 35 mm, and nominally about 42. In other embodiments, leg portion 210 may have other dimensions.

Pivot bore 212 comprises a bore through door 140 proximate end 224 of leg portion 210. Pivot bore 212 is configured receive an axle or shaft 230 (shown in FIGS. 5 and 9). Pivot bore 212 facilitates the hinging of door 140 for pivotal movement of door 140 between the extended and retracted positions shown in FIGS. 8 and 9. In other embodiments, door 140 may be pivotably supported or pivotably coupled to support 130 by other structures or hinge mechanisms besides shaft 230 and pivot bore 212. For example, end 224 of leg portion 210 may alternatively include oppositely extending pins which rotate within corresponding sockets provided by support 130.

Stop surfaces 214 comprise surfaces configured to cooperate with corresponding stop surfaces 236 (shown in FIG. 9) coupled to or provided by support 130. In the example illustrated, stop surfaces 214 abut stop surfaces 236 when or after the associated door 140 has fully rotated about the axis of shaft 2302 the extended position. In the example illustrated, stop surfaces 214 and 236 extend substantially perpendicular to the general axis along which door 140 extends when in the fully extended position shown in FIG. 9. In other embodiments, other mechanisms may be employed to limit or control the pivoting of door 140. For example, spring 143 may alternatively be configured such that the pivoting a rotation of door 140 is limited by spring 143.

Foot 216 projects from end 226 of leg portion 210 and provides a smooth, curved lower surface 240. Surface 240 abuts or contacts edge 148 of card 128 as support 130 and doors 140 are disposed with respect to base 122 and cards 128 as shown in FIG. 8. Surface 240 further contacts edge 148 after such this position has been completed as shown in FIG. 9. Surface 240 provides a curved lower surface that is less likely to undesirably catch upon edges, shoulders, depressions or projections of edge 148 of card 128. As a result, assembly and disassembly of computing device 120 is facilitated. In other embodiments, foot 216 may be omitted.

According to one embodiment, surface 240 has a radius of curvature of at least 6 mm. According to one embodiment, surface 240 has a width of at least 6 mm. In other embodiments, service 240 may have a different curvature and a different width.

Spline 218 comprises a protruberance or projection provided along surface 240 of foot 216. Spline 218 is curved and is smooth. Spline 218 has a spline width SW less than the width of foot 216 and less than or equal to the width of edge 248 of card 228. As a result, the amount of frictional contact between foot 216 or its spline 218 and edge 248 of card 228 is reduced, further facilitating sliding movement of foot 216 along edge 248 to facilitate assembly and disassembly of computing device 120. Spline 218 has tapered sides 251 providing a curved surface or a smooth ramp extending from surface 240 to an apex of spline 218. If support 230 and its doors 140 or offset from the generally opposite cards 228 during assembly, surface 240 may initially contact the edge 248 of the corresponding card 228. During alignment, tapered sides 251 may ride along the edges a card until the apex of spline 258 is located directly opposite to ending contact with the edge 248 of the corresponding card 228. As a result, assembly is facilitated.

According to one embodiment, spline 218 has a width SW of less than or equal to about 2 mm and blends into surface 240 towards a toe 250 of the foot 216. In other embodiments, spline 218 may have other dimensions and a curvature distinct from the curvature of foot 216. In some embodiments, the width of spline 218 may correspond to the width of foot 216, wherein foot 216 has an overall width less than the width of edge 248 of card 228. In other embodiments, spline 218 may be omitted.

FIGS. 8 and 9 illustrate final disposition of support 130 and doors 140 with respect to base 122 and cards 128. In the example illustrated, card receiving bay 126A is occupied or connected to card 128A while card receiving bay 126B is empty or is not connected to any card 128. Airflow restrictor door 140A is retained in a retracted position, against bias 143, above card 128. Bias 143 resiliently urges the end 226 of door 140A against a top edge 148 of card 128. In the example illustrated, portions of door 140A are received within a recess or pocket of support 130. During disposition of support 130 and doors 140 opposite to base 22 and card 28, door 140A contacts edge 148 of card 128A and is moved against the bias 143 to the retracted position.

Because card receiving bay 126B is unoccupied, the bias associated with door 140B urges door 140B to the extended position. In the extended position, door 140B restricts airflow through interior 142 on a side of card 128. As a result, a greater volume of air flows at a greater velocity across the heat generating components of computing device 120 to dissipate heat. Because doors 140 automatically move between the extended position and the retracted position in response to the presence or absence of card in the corresponding opposite card receiving bay 126, installation or assembly of computing device 20 is facilitated.

As shown by FIG. 9, in the example illustrated, when fully extended, door 140B extends oblique to both base 122 and support 130. Stop surface 214 abuts stop surface 236 to retain leg portion 210 at the oblique angle. In one embodiment, the oblique angle is such that surface 240 is elevated and spaced from base 222 and above card receiving bay 12613. As a result, door 140B is less likely to catch or engage upon base 222 or the opposite corresponding card receiving bay 226B.

In other embodiments, the oblique angle may be such that surface 240 of foot 216 contacts or rests upon base 222. In some embodiments, service 240 foot 216 may contact our rest upon base 222 prior to surface 214 contacting surface 236. In such embodiments, surface 214 and 216 control the extent to which door 140 tickets to the extended position prior to contact of surface 240 a foot 216 with base 222.

Because door 140B is oblique with respect to base 122 as well as oblique to edge 148 of card 128 (when a card 128 is present in the opposite card receiving bay 126), door 140B may be pivoted against bias 143 towards the retracted position upon contacting edge 148 with less force. As a result, actuation of those doors 140 to the retracted position in the presence of opposite cards 128 is facilitated.

According to one embodiment, doors 140 are supported and retained at an angle A2 of less than or equal to 60 degrees. In another embodiment, doors 140 are supported and retained at an angle of less than or equal to about 45 degrees to enlarge the lever arm for movement of doors 140. In the example illustrated, doors 140 are supported and retained at an angle of about 53 degrees with respect to the general plane along which support 130 extends. In other embodiments, doors 140 may be supported and retained at other angles when in the extended position. In other embodiments, the limiting of the pivoting of doors 40 may be attained using other structures instead of stop surfaces 214, 236.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
   a card receiving bay;
   a support opposite the bay, the support including a pocket; and
   a first airflow restrictor door pivotably supported by and extending from the support towards the bay, the door comprising:
   a proximal end having a proximal end surface adjacent the support and facing away from the support towards the bay; and
   a distal end having a distal end surface facing away from the support towards the bay,
   wherein the first door is pivotable between an extended position across the bay and a retracted position from the bay and wherein the distal end surface is at least partially received in the pocket when in the retracted position.

2. The apparatus of claim 1, wherein the first door is resiliently biased towards the extended position.

3. The apparatus of claim 1, wherein the first door obliquely extends from the support when in the extended position.

4. The apparatus of claim 3, wherein the first door includes a foot having a curved lower surface.

5. The apparatus of claim 4, wherein the foot has a spline along the lower surface.

6. The apparatus of claim 1, wherein the first door extends substantially parallel to the bay in the retracted position.

7. The apparatus of claim 1, wherein the first door includes a first stop surface and wherein the support includes a second stop surface, the first stop surface and the second stop surface abutting contact to limit pivoting of the first door towards the bay.

8. The apparatus of claim 7, wherein the first stop surface abuts the second stop surface to support the first door obliquely to the bay.

9. The apparatus of claim 1, wherein the first door extends from the support at an angle of less than or equal to about 60 degrees when in the extended position.

10. The apparatus of claim 1, wherein the first door includes a foot having a curved lower surface facing the bay.

11. The apparatus of claim 10, wherein the foot has a spline along the lower surface.

12. The apparatus of claim 1 further comprising a DIMM memory card received within the bay, wherein the first door contacts and edge of the DIMM card.

13. The apparatus of claim 1 further comprising:
   a second card receiving bay; and
   a second airflow restrictor door pivotably supported by and extending from the support towards the second bay.

14. The apparatus of claim 13, wherein the first door and the second door are pivotable about a same axis.

15. The apparatus of claim 1, wherein the door has a width of at least about 6 mm.

16. An apparatus comprising:
a first card receiving bay;
a second card receiving bay;
a support opposite the first bay and the second bay, the support including a first pocket opposite the first bay and a second pocket opposite the second bay;
a first airflow restrictor door pivotably supported by and extending from the support towards the first bay, the first door including a foot having a curved lower surface facing the bay, wherein the first door is pivotable between an extended position obliquely extending across the first bay and a retracted position in the first pocket and wherein the first door is resiliently biased towards the extended position; and
a second airflow restrictor door pivotably supported by and extending from the support towards the second bay, the second door including a foot having a curved lower surface facing the bay, wherein the second door is pivotable between an extended position obliquely extending across the second bay and a retracted position in the second pocket and wherein the second door is resiliently biased towards the extended position.

17. The apparatus of claim 1, wherein the distal end surface comprises a portion configured to contact a card within the bay when the first airflow restrictor door is in the extended position and wherein the portion is received within the pocket when the first airflow restrictor door is in the retracted position.

18. The apparatus of claim 1, wherein the first airflow restrictor door have a front side facing the bay and a backside facing the support, wherein the first airflow restrictor door and the support form an open airflow space between the first airflow restrictor door and the support across the backside of the door between other bays adjacent opposite side of the bay.

19. The apparatus of claim 1, wherein the first airflow restrictor door has a foot, wherein a lower surface of the foot extends into the pocket when the first airflow restrictor door is in the retracted position.

20. The apparatus of claim 1, wherein an entirety of the first airflow restrictor door at a midpoint of the first airflow restrictor door between the distal end and the proximal end extends below a pivot axis of the first airflow restrictor door when the first airflow restrictor door is in the retracted position.

21. An apparatus comprising:
a card receiving bay;
a support opposite the bay; and
a first airflow restrictor door pivotably supported by and extending from the support towards the bay, wherein the first door is pivotable between an extended position across the bay and a retractable position from the bay and wherein the first door is resiliently biased towards the extended position, wherein the first door obliquely extends from the support when in the extended position and wherein the first door includes a foot having a curved lower surface.

22. The apparatus of claim 21, wherein the foot has a spline along the lower surface.

23. The apparatus of claim 22, wherein the bay is configured to receive a card having a width and wherein the spline has a width less than the width of the card.

24. The apparatus of claim 22, wherein the spline is curved and smooth.

25. The apparatus of claim 22, wherein the spline has tapered sides.

26. The apparatus of claim 22, wherein the spline comprises an elongate strip protruding from the curved lower surface.

* * * * *